(12) United States Patent
Shimanouchi

(10) Patent No.: US 7,126,249 B2
(45) Date of Patent: Oct. 24, 2006

(54) ELECTROSTATIC ACTUATOR INCLUDING STABLE ELECTRODE COLUMN AND WALL

(75) Inventor: Takeaki Shimanouchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 109 days.

(21) Appl. No.: 10/014,992

(22) Filed: Dec. 11, 2001

(65) Prior Publication Data

US 2003/0001453 A1    Jan. 2, 2003

(30) Foreign Application Priority Data

Jul. 2, 2001    (JP) .............................. 2001-200668

(51) Int. Cl.
*H02N 1/00*    (2006.01)
(52) U.S. Cl. ..................................... 310/309
(58) Field of Classification Search ................ 310/309; 73/514.32, 504.12
See application file for complete search history.

(56) References Cited

U.S. PATENT DOCUMENTS

| | | | | |
|---|---|---|---|---|
| 5,747,690 | A * | 5/1998 | Park et al. ............... | 73/504.12 |
| 6,133,059 | A * | 10/2000 | Werner ........................ | 438/52 |
| 6,227,050 | B1 * | 5/2001 | Fujii et al. ................ | 73/514.32 |
| 6,240,782 | B1 * | 6/2001 | Kato et al. ............... | 73/514.32 |
| 6,393,913 | B1 * | 5/2002 | Dyck et al. ............... | 73/504.12 |
| 6,465,355 | B1 * | 10/2002 | Horsley ....................... | 438/694 |
| 6,524,878 | B1 * | 2/2003 | Abe et al. ..................... | 438/52 |
| 6,543,285 | B1 * | 4/2003 | Hashimoto ............... | 73/504.14 |
| 2003/0001453 | A1 * | 1/2003 | Shimanouchi .............. | 310/309 |

FOREIGN PATENT DOCUMENTS

JP    2003-018868    *    2/2003

* cited by examiner

*Primary Examiner*—Karl Tamai
(74) *Attorney, Agent, or Firm*—Greer, Burns & Crain, Ltd.

(57) ABSTRACT

An electrostatic actuator allows a movable electrode to move in response to the generation of electrostatic attraction between the movable electrode and the first stable electrode wall as well as between the movable electrode and the second stable electrode wall. An insulating solid piece is interposed between the first and second stable electrode walls so as to connect the first and second stable electrode walls to each other. The insulating solid piece serves to enhance the rigidity of the first and second stable electrode walls. A higher rigidity can be established in the first and second stable electrode walls of the electrostatic actuator even if the wall thickness of the first and second stable electrode walls is reduced. The reduced wall thickness of the first and second stable electrode walls enables arrangement of the first and second stable electrode walls as many as possible within a limited space. As the number of the stable electrode walls, opposed to the movable electrode, gets increased, a larger driving force can be generated to act on the movable electrode in the electrostatic actuator.

8 Claims, 10 Drawing Sheets

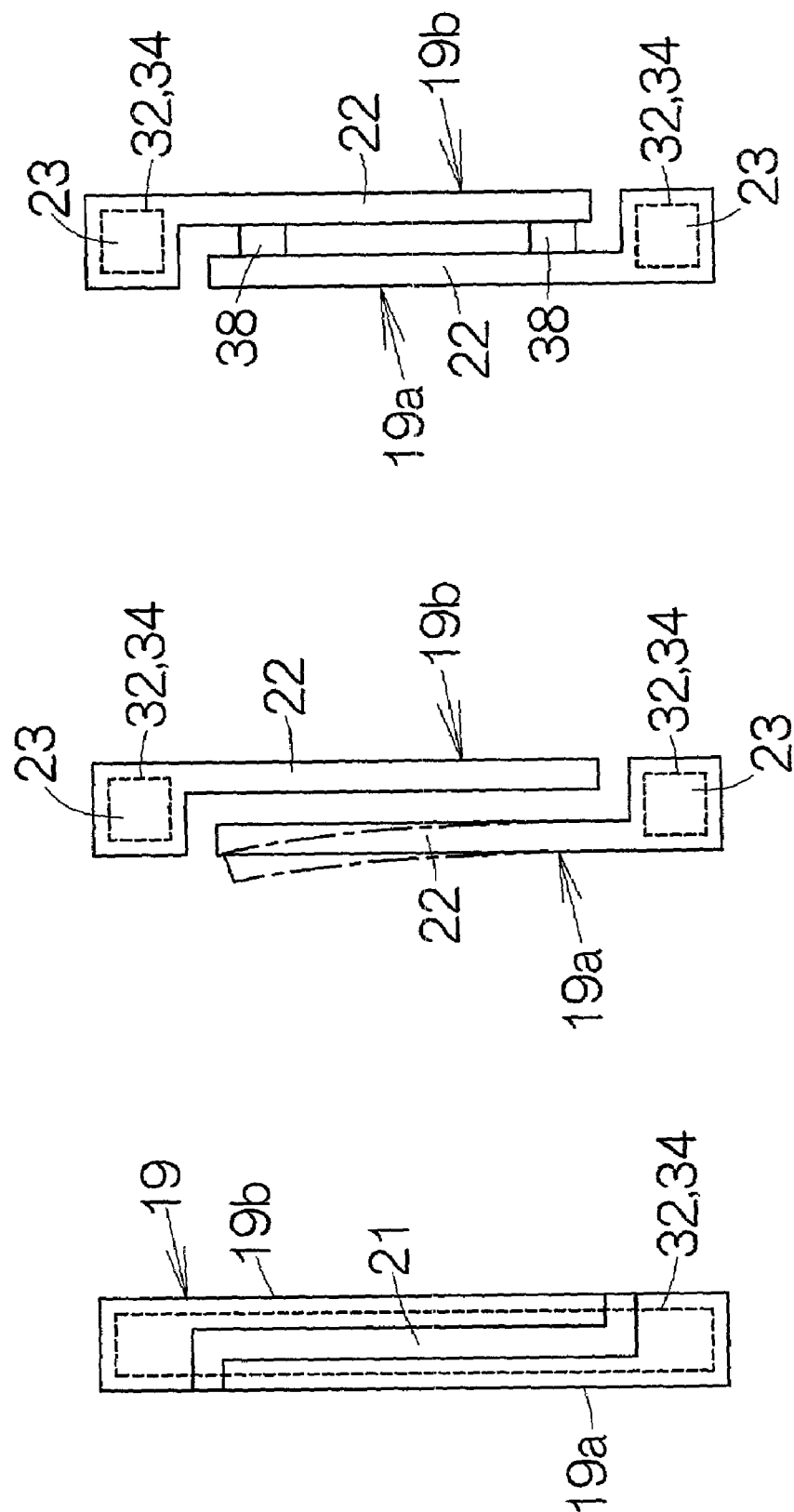

ELECTROSTATIC ACTUATOR INCLUDING STABLE ELECTRODE COLUMN AND WALL

BACKGROUND OF THE INVENTION

1. Field of the Invention

The present invention relates to an electrostatic actuator expected for a drive source of a micromachine.

2. Description of the Prior Art

In general, an electrostatic actuator includes a stable or fixed electrode and a movable electrode spaced from the stable electrode. An airspace is defined between the stable and movable electrodes. When a minute electric current is supplied to the stable electrode, an electrostatic attraction is generated between the stable and movable electrodes. The generated electrostatic attraction acts on the movable electrode, so that the movable electrode is caused to move toward the stable electrode.

As the number of stable and movable electrodes gets increased, a larger driving force can be generated in the electrostatic actuator. At the same time, as sets of the stable and movable electrodes get increased, the electrostatic actuator should occupy a larger space. It is preferable that sets of the stable and movable electrodes are disposed as many as possible within a limited space in the electrostatic actuator.

SUMMARY OF THE INVENTION

It is accordingly an object of the present invention to provide an electrostatic actuator capable of generating a larger driving force even within a limited space.

According to the present invention, there is provided an electrostatic actuator comprising: a movable electrode disposed for relative displacement along a basement plane and defining first and second opposed surfaces opposed to each other; a first stable electrode wall opposed to the first opposed surface of the movable electrode; a second stable electrode wall opposed to the second opposed surface of the movable electrode; and an insulating solid piece connecting the first and second stable electrode walls.

When a minute electric current is supplied to the first stable electrode wall in the electrostatic actuator, an electrostatic attraction can be induced between the first opposed surface of the movable electrode and the first stable electrode wall. The movable electrode is thus moved toward the first stable electrode wall. On the other hand, when a minute electric current is supplied to the second stable electrode wall in the electrostatic actuator, an electrostatic attraction can be induced between the second opposed surface of the movable electrode and the second stable electrode wall. The movable electrode is thus moved toward the second stable electrode wall. The movement of the movable electrode is realized in this manner.

In addition, a structural or physical connection can be established between the first and second stable electrode walls irrespective of the electric isolation between the first and second stable electrode walls in the electrostatic actuator. The rigidity of the first and second stable electrode walls can be enhanced as compared with the case where the first and second stable electrode walls independently exist. Any electrostatic attraction between the first stable electrode wall and the movable electrode as well as between the second stable electrode wall and the movable electrode cannot cause deformation of the first and second stable electrode walls. It is possible to realize the movement of the movable electrode in an expected manner.

In particular, a higher rigidity can be established in the first and second stable electrode walls of the electrostatic actuator even if the wall thickness of the first and second stable electrode walls is reduced. The reduced wall thickness of the first and second stable electrode walls enables arrangement of the first and second stable electrode walls as many as possible within a limited space. As the number of the stable electrode walls, opposed to the movable electrode, gets increased, a larger driving force can be generated to act on the movable electrode in the electrostatic actuator.

The insulating solid piece may be made of any of silicon dioxide, silicon nitride, alumina, glass and resin. The first and second stable electrode walls may extend in parallel with each other. The movable electrode may be a frame member surrounding the first and second stable electrode walls.

The first and second stable electrode walls may stand on the basement plane. Specifically, the first and second stable electrode walls may be fixed to the basement plane with an insulating layer. A structural or physical connection between the first electrode wall as well as the second electrode wall and the base plane or substrate leads to a still higher rigidity of the first and second stable electrode walls.

There may be provided a method of making the aforementioned electrostatic actuator, comprising: overlaying a subsidiary substrate over a base substrate holding an insulating film between the subsidiary substrate and the base substrate; forming a void in the subsidiary substrate so as to allow the surface of the insulating film to get exposed at a bottom of the void; filling the void with an insulating material; and carving a pair of stable electrodes or electrode walls out of the subsidiary substrate, said insulating material being interposed between the stable electrodes. An airspace or a bubble may remain in the insulating material within the void.

The method may further comprise: carving a movable electrode out of the subsidiary substrate when the stable electrodes are carved; and removing the insulating film from a space between the movable electrode and the base substrate. The movable electrode and the stable electrodes can simultaneously be carved out of the subsidiary substrate. When the insulating film is thereafter removed, the movable electrode can be separated from the base substrate. The relative movement of the movable electrode can thus be established on the base substrate. In this case, the insulating film preferably remains between the stable electrodes and the base substrate.

The electrostatic actuator as described above may be mounted on a head slider incorporated in a hard disk drive (HDD), or utilized in an optical switching mechanism, for example.

BRIEF DESCRIPTION OF THE DRAWINGS

The above and other objects, features and advantages of the present invention will become apparent from the following description of the preferred embodiment in conjunction with the accompanying drawings, wherein:

FIG. 15 is an enlarged plan view of the stable electrode unit for schematically illustrating the insulating films remaining below the stable electrode unit;

FIG. 16 is an enlarged plan view of the stable electrode unit for schematically illustrating the insulating films remaining below stable electrodes independently formed on the base substrate;

FIG. 17 is an enlarged plan view of the stable electrode unit for schematically illustrating an solid insulating material connecting first and second stable electrodes to each other;

DESCRIPTION OF THE PREFERRED EMBODIMENT

Figure 1:
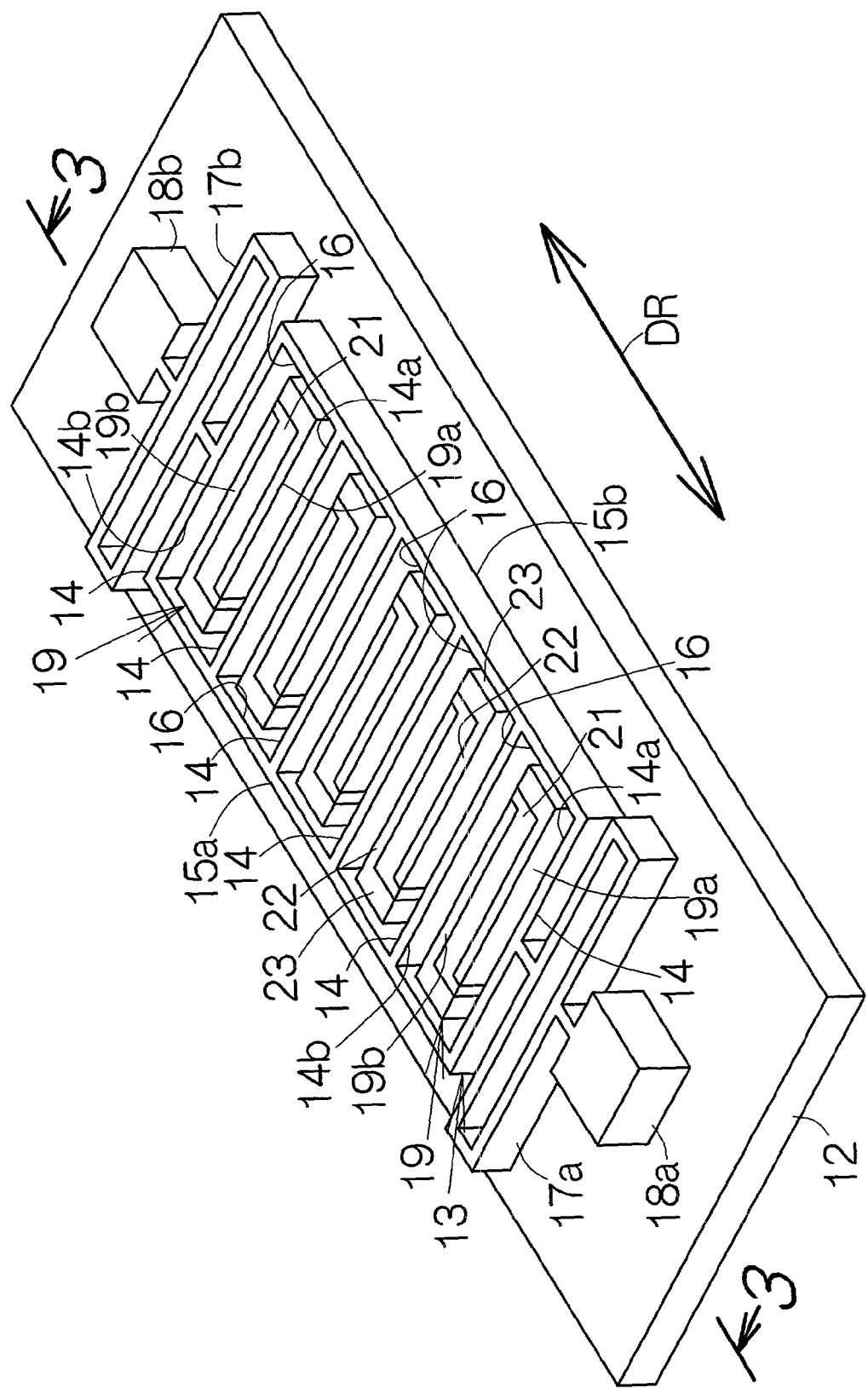
FIG. 1 is a perspective view schematically illustrating the structure of an electrostatic actuator according to the present invention.

FIG. 1 schematically illustrates the entire structure of an electrostatic actuator 11. The electrostatic actuator 11 includes a frame member of an electrically conductive material, namely, a movable member 13. The movable member 13 is allowed to move or reciprocate in the back-and-forth direction DR along a basement plane, namely, on the surface of a base substrate 12. The movable member 13 includes movable electrode walls 14 spaced from one another. The movable electrode walls 14 may simply be extended in parallel with one another. The opposite ends of the individual movable electrode walls 14 are respectively connected to a pair of side frames 15a, 15b extending in the back-and-forth direction DR. The side frames 15a, 15b may extend in parallel with each other. Accommodation spaces 16 of a rectangular parallelepiped are defined in the movable member 13. The individual accommodation space 16 is surrounded by the adjacent movable electrode walls 14 and the side frames 15a, 15b. A first opposed surface 14a is defined on the movable electrode wall 14 on the front side of the individual accommodation space 16. A second opposed surface 14b is likewise defined on the movable electrode wall 14 on the rear side of the individual accommodation space 16. The second opposed surface 14b is allowed to get opposed to the first opposed surface 14a in the single accommodation space 16. The movable electrode walls 14 as well as the side frames 15a, 15b may have a constant wall thickness, for example.

An end of a first spring member 17a is connected to the front surface of the movable member 13, namely, the outside surface of the forehand movable electrode wall 14. The other end of the first spring member 17a is connected to a first stationary pedestal 18a fixed on the surface of the base substrate 12. Likewise, a second spring member 17b is connected to the back surface of the movable member 13, namely, the outside surface of the movable electrode wall 14 at the tail end. The other end of the second spring member 17b is connected to a second stationary pedestal 18b fixed on the surface of the base substrate 12. The first and second spring members 17a, 17b serve to connect the movable member 13 to the base substrate 12 for relative displacement or reciprocation in the back-and-forth direction DR. The first and second spring members 17a, 17b may have the wall thickness smaller than that of the movable electrode walls 14 and the side frames 15a, 15b. The first and second pedestals 18a, 18b may occupy a larger area on the surface of the base substrate 12. The movable member 13, the first and second spring members 17a, 17b and the first and second pedestals 18a, 18b may be formed out of a common mass material, for example, as described later in detail.

A stable or fixed electrode unit 19 is disposed within the individual accommodation space 16. The stable electrode units 19 stand on the surface of the base substrate 12. The stable electrode unit 19 includes front and rear or first and second stable or fixed electrodes 19a, 19b, and an insulating solid piece or insulator wall 21 interposed between the first and second stable electrodes 19a, 19b. The insulator wall 21 serves to couple the first and second stable electrodes 19a, 19b to each other. At the same time, the insulator wall 21 serves to electrically isolate the first and second stable electrodes 19a, 19b from each other. The insulator wall 21 may be made from silicon dioxide ($SiO_2$), silicon nitride, alumina ($Al_2O_3$), glass, resin, or any other type of insulating material.

Figure 2:
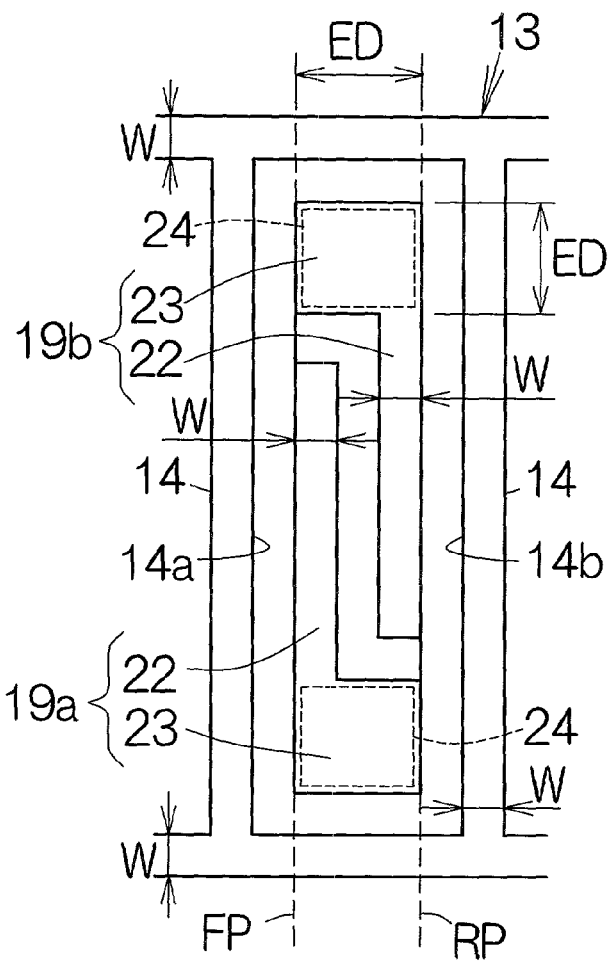
FIG. 2 is an enlarged partial plan view of the electrostatic actuator illustrating a stable electrode unit.

The individual stable electrodes 19a, 19b include an electrode wall 22 opposed to the movable electrode wall 14 and a column 23 coupled to the end of the electrode wall 22. The electrode wall 22 of the front or first electrode 19a is opposed to the movable electrode wall 14 of the front side. Likewise, the electrode wall 22 of the rear or second electrode 19b is opposed to the movable electrode wall 14 of the rear side. As is apparent from FIG. 2, a wall surface is defined on the electrode wall 22 of the first stable electrode 19a so as to extend on a datum plane FP in parallel with the first opposed surface 14a. An airspace of a predetermined thickness is interposed between the wall surface and the first opposed surface 14a. Likewise, a wall surface is defined on the electrode wall 22 of the second stable electrode 19b so as to extend on a datum plane RP in parallel with the second opposed surface 14b. An airspace of a predetermined thickness is interposed between the wall surface and the second opposed surface 14b.

The columns 23 of the first and second stable electrodes 19a, 19b are fixed to the base substrate 12 at square or rectangular sections 24 defined on the surface of the base substrate 12 between the datum planes FP, RP, for example. The length of the respective sides ED of the sections 24 is set three times or more larger than the wall thickness W of the movable electrode walls 14 and the side frames 15a, 15b. The columns 23 of the stable electrodes 19a, 19b thus have a sectional area continuous to the surface of the base substrate 12 over the area larger than 9 $W^2$, for example. The wall thickness W the stable electrodes 19a, 19b may be set equal to that of the movable electrode walls 14 and the side frames 15a, 15b.

Figure 3:
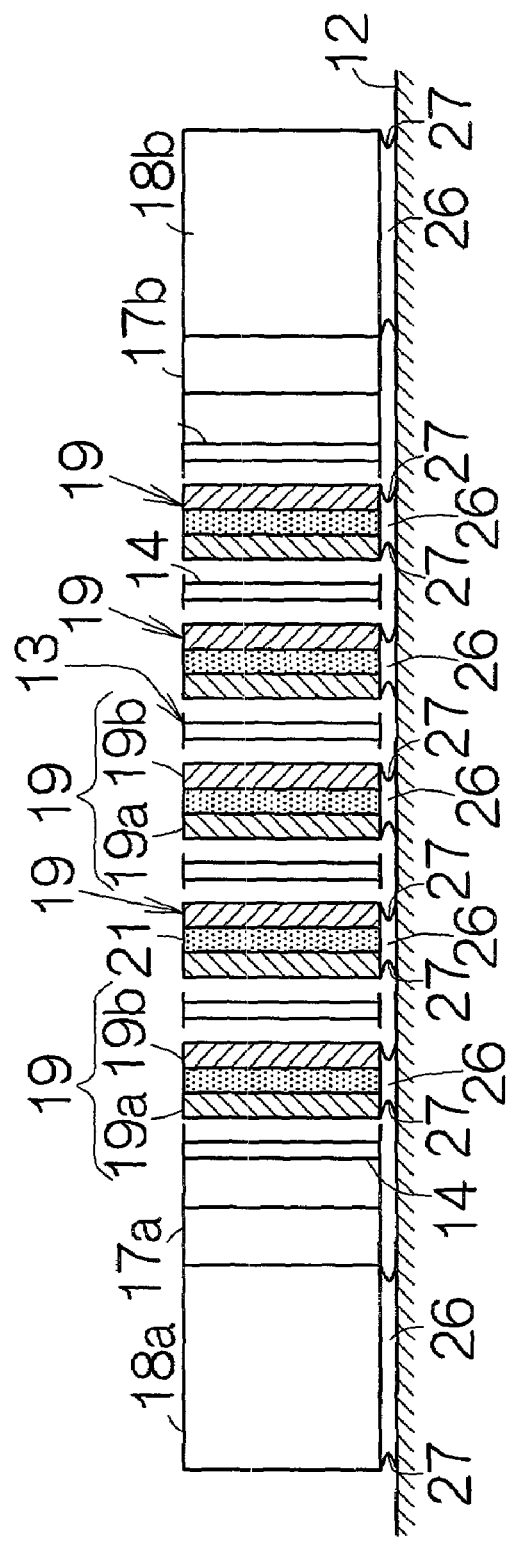
FIG. 3 is a sectional view taken along the line 3—3 in FIG. 1.

As shown in FIG. 3, an insulating layer 26, made of silicon dioxide, for example, is interposed between the surface of the base substrate 12 and the pedestals 18a, 18b as well as the stable electrode unit 19. The insulating layer 26 serves to fix the pedestals 18a, 18b as well as the stable electrode unit 19 to the surface of the base substrate 12. Corrosion vestiges 27 are formed on the insulating layer 26. The corrosion vestiges 27 retract inward from the contours of the pedestals 18a, 18b and the stable electrode unit 19, respectively. An airspace serves to space the movable member 13 and the spring members 17a, 17b from the surface of the base substrate 12. Specifically, the movable member 13 and the spring members 17a, 17b are kept spaced from the surface of the base substrate 12 within a space between the pedestals 18a, 18b.

Figure 4:
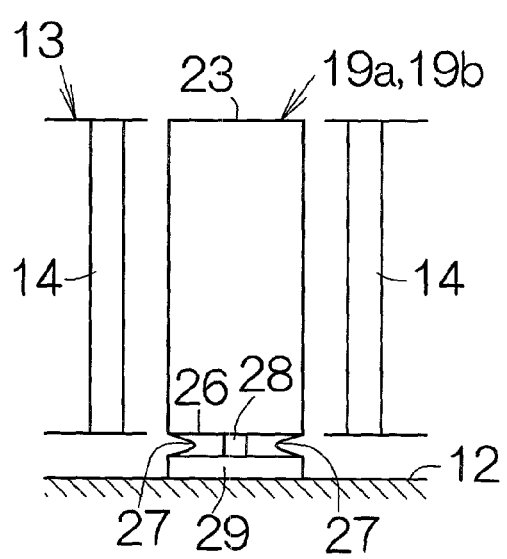
FIG. 4 is an enlarged partial sectional view of FIG. 2 illustrating the electric connection between a base substrate and the stable electrode unit.

As shown in FIG. 4, electrically conductive pieces 28 are embedded within the insulating layer 26 between the surface of the base substrate 12 and the columns 23 of the individual stable electrode 19a, 19b. The electrically conductive piece 28 stands on a conductive wiring pattern 29 extending over the surface of the base substrate 12. The top or tip end of the electrically conductive piece 28 is connected to the column 23 of the stable electrode 19a, 19b. The conductive wiring pattern 29 provides separate paths for electric current for the first and second stable electrodes 19a, 19b.

Now, when a minute electric current is supplied to the first stable electrodes 19a, electrostatic attractions can be established between the electrode walls 22 of the respective first stable electrodes 19a and the corresponding first opposed surfaces 14a of the movable electrode walls 14. The electrostatic attractions serve to drive the movable member 13 rearward toward the second pedestal 18b. The rearward movement of the movable member 13 is thus realized. The first spring member 17a expands while the second spring member 17b compresses.

To the contrary, when a minute electric current is supplied to the second stable electrodes 19b, electrostatic attractions can be established between the electrode walls 22 of the respective second stable electrodes 19b and the corresponding second opposed surfaces 14b of the movable electrode walls 14. The electrostatic attractions serve to drive the movable member 13 forward toward the first pedestal 18a. The forward movement of the movable member 13 is thus realized. In this case, the first spring member 17a compresses while the second spring member 17b expands.

Figure 5:
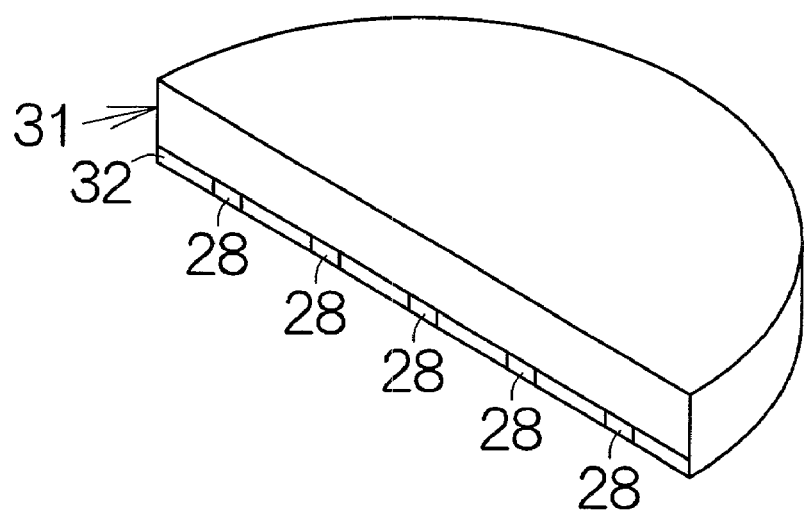
FIG. 5 is a perspective view with a partial sectional view for illustrating the concept of a subsidiary substrate.

Next, a brief description will be made on a method of making the electrostatic actuator 11. As shown in FIG. 5, a silicon wafer or subsidiary substrate 31 is prepared. The back surface of the subsidiary substrate 31 is covered with an insulating film 32 made of silicon dioxide ($SiO_2$), for example. The aforementioned electrically conductive pieces 28 are embedded within the insulating film 32. The electrically conductive pieces 28 get exposed at the surface of the insulating film 32.

Figure 6:
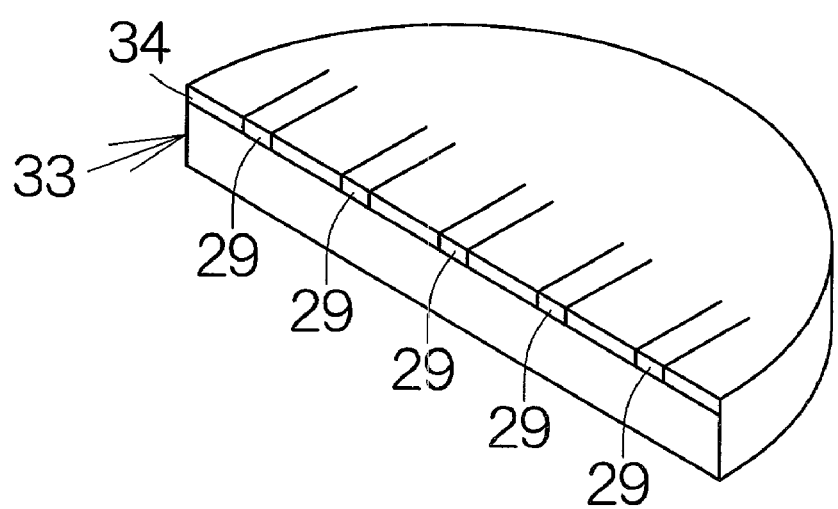
FIG. 6 is a perspective view with a partial sectional view for illustrating the concept of a base substrate.

As shown in FIG. 6, a silicon wafer or base substrate 33 is also prepared. The upper surface of the base substrate 33 is covered with an insulating film 34 made of silicon dioxide ($SiO_2$), for example. The aforementioned conductive wiring pattern 29 is embedded within the insulating film 34. The upper surface of the conductive wiring pattern 29 gets exposed at the surface of the insulating film 34.

The subsidiary substrate 31 is overlaid on the base substrate 33. The back surface of the subsidiary substrate 31 is received on the upper surface of the base substrate 33. The insulating films 32, 34 are both interposed between the subsidiary substrate 31 and the base substrate 33. The exposed surfaces of the electrically conductive pieces 28 are received on the upper surface of the conductive wiring pattern 29.

Figure 7:
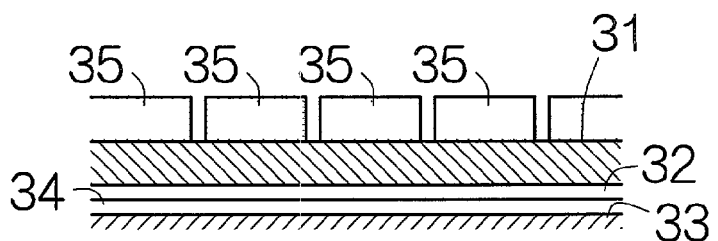
FIG. 7 is an enlarged partial sectional view of the subsidiary substrate for schematically illustrating a resist film formed on the surface of the subsidiary substrate.
Figure 9:
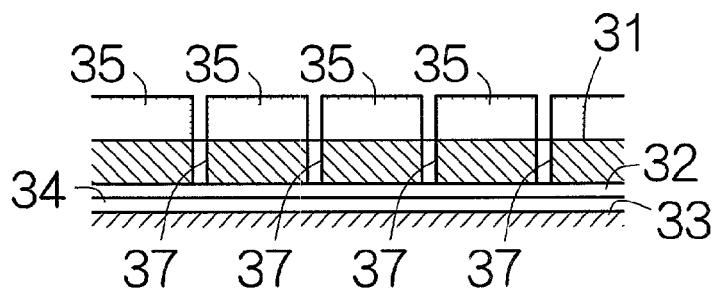
FIG. 9 is an enlarged partial sectional view of the subsidiary substrate for schematically illustrating a void formed based on an etching process.
Figure 10:
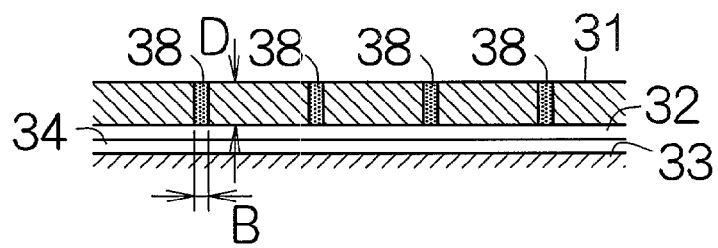
FIG. 10 is an enlarged partial sectional view of the subsidiary substrate for schematically illustrating an insulating material filled in the void.
Figure 8:
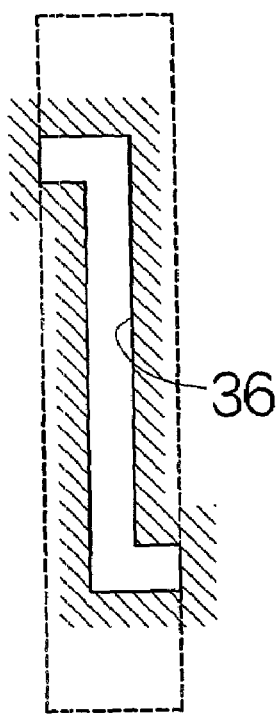
FIG. 8 is an enlarged partial plan view of the subsidiary substrate for schematically illustrating the shape of a groove formed in the resist film.

As shown in FIG. 7, a resist film 35 is formed over the upper surface of the subsidiary substrate 31. The resist film 35 is designed to define elongated grooves 36 each corresponding to the shape of the insulator wall 21, as shown in FIG. 8, for example. The subsidiary substrate 31 is then subjected to an etching process. The subsidiary substrate 31 is removed at the area off the resist film 35. Voids 37 corresponding to the insulator walls 21 are thus formed in the subsidiary substrate 31. The voids 37 serves to expose the surface of the insulating film 32. The resist film 35 may be removed after the voids 37 have been formed.

The voids 37 are filled with an insulating material 38. In the case where silicon dioxide or silicon nitride is employed as the insulating material 38, the insulating material 38 may be supplied to the voids 37 based on a so-called chemical vapor deposition (CVD) technique. Alternatively, in the case where a liquid material, such as an SOG (Spin On Glass), a resist agent, or resin, is employed as the insulating material 38, the insulating material 38 may be supplied to the voids 37 based on a spin coating or a dip coating technique, for example. After the supply, the liquid material is allowed to get solidified. After the voids 37 have fully been filled with the solid insulating material 38, the exposed surface of the subsidiary substrate 31 is subjected to a flattening treatment by polishing or grinding, for example.

If the aspect ratio (=D/B) of the vertical section of the void 37 is larger, the liquid material hardly get into the void 37. In such a case, any pressure may be employed to forcibly introduce the liquid material into the void 37. For example, the liquid material is first dropped into the voids 37 under the vacuum condition. When the subsidiary substrate 31 is taken out into the normal atmosphere, the liquid material is efficiently introduced into the voids 37. However, it is not necessary to completely fill up the void 37 with the insulating material 38. An airspace or a bubble may remain in the void 37. The solid insulating material 38 is only required to connect the opposed wall surfaces to each other within the void 37.

Figure 11:
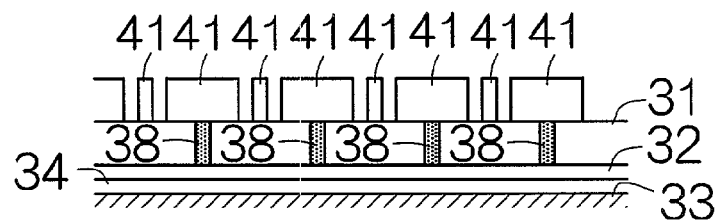
FIG. 11 is an enlarged partial sectional view of the subsidiary substrate for schematically illustrating a resist film formed on the surface of the subsidiary substrate after the filling of the insulating material.
Figure 12:
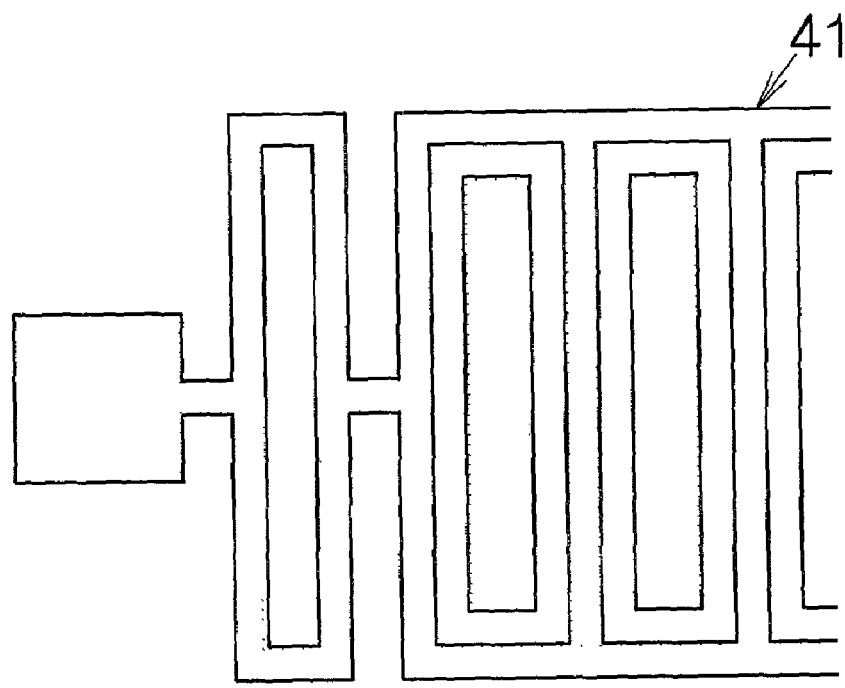
FIG. 12 is an enlarged partial plan view of the subsidiary substrate for schematically illustrating the shape of the resist film.
Figure 13:
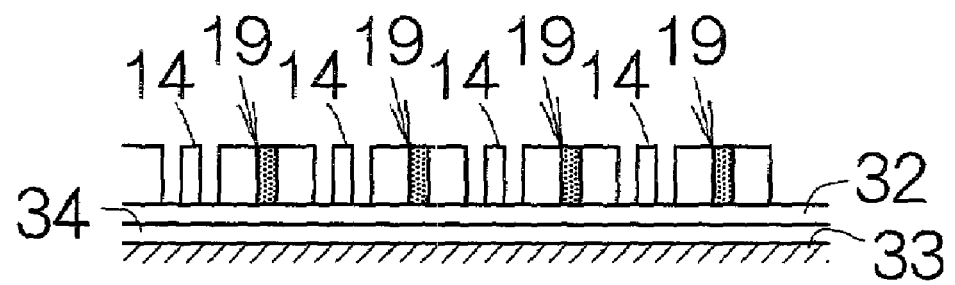
FIG. 13 is an enlarged partial sectional view of the subsidiary substrate for schematically illustrating a movable member and the stable electrode unit carved out of the subsidiary substrate.

Subsequently, a resist film 41 is formed to extend over the exposed surface of the subsidiary substrate 31, as shown in FIG. 11. As is apparent from FIG. 12, the resist film 41 is designed to define the shapes of the movable member 13, the spring members 17a, 17b, the pedestals 18a, 18b and the stable electrode units 19. The subsidiary substrate 31 is then subjected to an etching process. The subsidiary substrate 31 is removed at the area off the resist film 41. The movable member 13, the spring members 17a, 17b, the pedestals 18a, 18b and the stable electrode units 19 are carved out of the subsidiary substrate 31 in this manner, as shown in FIG. 13. The resist film 41 may be removed after the movable member 13, the spring members 17a, 17b, the pedestals 18a, 18b and the stable electrode units 19 have been formed.

Thereafter, the insulating films 32, 34 are subjected to an etching process on the base substrate 33. The movable member 13, the spring members 17a, 17b, the pedestals 18a, 18b and the stable electrode units 19, carved out of the subsidiary substrate 31, serve as masks. The insulating films 32, 34 are removed at the area off the movable member 13, the spring members 17a, 17b, the pedestals 18a, 18b and the stable electrode units 19. An etching agent such as BHF may be employed to wash off the insulating films 32, 34 in the etching process, for example.

Figure 14:
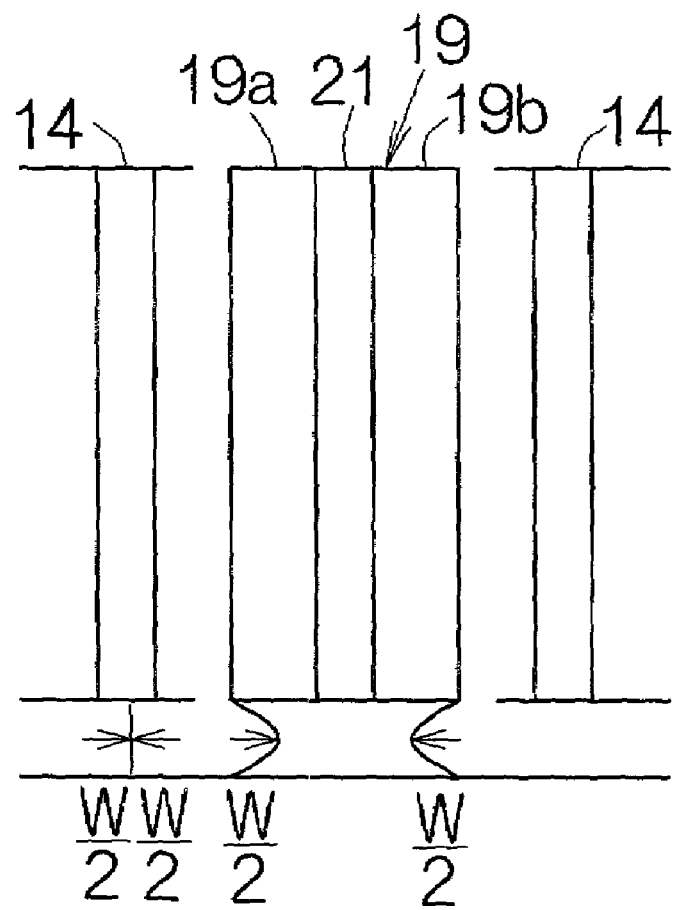
FIG. 14 is an enlarged vertical sectional view of the stable electrode unit for schematically illustrating the removal of insulating films.

As shown in FIG. 14, the insulating films 32, 34 suffer from corrosion on the base substrate 33 below the movable member 13, the spring members 17a, 17b, the pedestals 18a, 18b and the stable electrode units 19, even when the movable member 13, the spring members 17a, 17b, the pedestals 18a, 18b and the stable electrode units 19 function as masks. The insulating films 32, 34 are thus completely removed below the movable member 31 and the spring members 17a, 17b. The movable member 13 and the spring members 17a, 17b can be separated from the base substrate 33 in this manner.

The duration or rate of the etching process can be set based on the parameter W/2 (half of the wall thickness W), for example. When the etching agent has completely washed off the insulating films 32, 34 below the movable member 13 and the spring members 17a, 17b of the wall thickness W, the insulating films 32, 34 below the stable electrode units 19 and the pedestals 18a, 18b likewise suffer from corrosion in the amount of W/2 from the contours or peripheries of the stable electrode units 19 and the pedestals 18a, 18b. However, as is apparent from FIG. 15, the insulating films 32, 34 still remain enough below the stable electrode units 19 and the pedestals 18a, 18b irrespective of the corrosion. In particular, even when the electrode walls 22 of the stable electrodes 19a, 19b are designed to have the wall thickness W equal to that of movable member 13, the stable electrode units 19 can strongly be held on the base substrate 13 even after the etching process.

On the other hand, if the insulator wall 21 is not disposed between the first and second stable electrodes 19a, 19b so that the individual stable electrodes 19a, 19b are designed to independently stand on the surface of the base substrate 33, the insulating films 32, 34 are supposed to remain only below the columns 23 of the first and second stable electrodes 19a, 19b, as shown in FIG. 16. The electrode walls 22 of the first and second stable electrodes 19a, 19b are completely separated from the surface of the base substrate 33. In this case, when an electrostatic attraction is induced between the first stable electrode 19a and the movable electrode wall 14, for example, the electrode wall 22 of the first stable electrode 19a deforms, as is apparent from FIG. 16. The movable member 13 cannot move in an expected manner even when a minute electric current is supplied to the first stable electrode 19a. In the same manner, the movable member 13 cannot move in an expected manner even when a minute electric current is supplied to the second stable electrode 19b since the second stable electrode 19b likewise easily deforms.

Otherwise, even when the insulating films 32, 34 are completely removed below the electrode walls 22 of the first and second stable electrodes 19a, 19b, a higher rigidity of the first and second stable electrodes 19a, 19b can be established by simply connecting the first and second stable electrodes 19a, 19b to each other with solid insulating materials 38, as shown in FIG. 17, for example. The electrostatic actuator 11 of this type also allows the movable member 13 to move in an expected manner when a minute electric current is supplied to any of the first and second stable electrodes 19a, 19b.

As described above, a higher rigidity can be established in the first and second stable electrodes 19a, 19b of the electrostatic actuator 11 even if the wall thickness W of the first and second stable electrodes 19a, 19b is reduced. The reduced wall thickness W of the first and second stable electrodes 19a, 19b enables arrangement of the first and second stable electrodes 19a, 19b as many as possible within a limited space. As the number of the stable electrodes 19a, 19b and the movable electrode walls 14 gets increased, a larger driving force can be generated to act on the movable member 13 in the electrostatic actuator 11.

A larger driving force for the movable member 13 enables an increased rigidity of the first and second spring members 17a, 17b. A higher rigidity of the spring members 17a, 17b leads to establishment of a higher resonant frequency between the spring members 17a, 17b and an electric current or drive signals supplied to the electrostatic actuator 11. The drive signals of a higher frequency range can easily be utilized to operate the electrostatic actuator 11. In addition, when the spring members 17a, 17b are allowed to have a higher rigidity, the spring members 17a, 17b can reliably be prevented from damages during production of the electrostatic actuator 11. The yield of the electrostatic actuator 11 can be improved.

Figure 18:
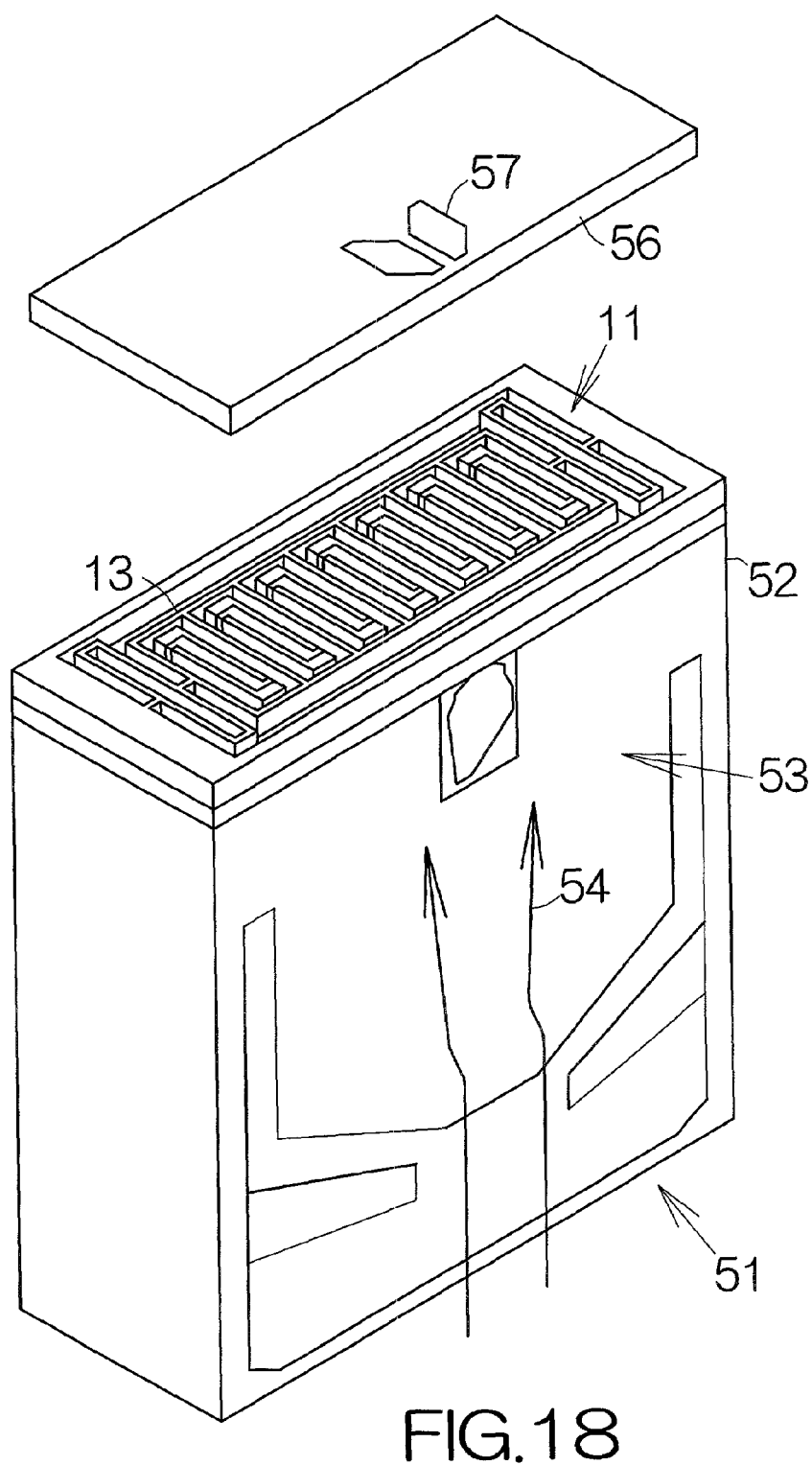
FIG. 18 is a partially exploded perspective view of a head slider incorporating the electrostatic actuator.

The electrostatic actuator 11 may be incorporated into a head slider 51 for a hard disk drive (HDD), for example, as shown in FIG. 18. The head slider 51 includes a slider body 52 of silicon for receiving the electrostatic actuator 11. A medium-opposed or bottom surface 53 is defined over the slider body 52. The slider body 52 is designed to get opposed to a magnetic recording disk at the bottom surface 53 in the HDD. The slider body 52 is allowed to receive an airflow 54 generated along the rotating recording magnetic disk in the HDD. The airflow 54 flows along the bottom surface 53 from the upstream or leading end to the downstream or trailing end in the back-and-forth direction of the slider body 52. The airflow 54 serves to generate a lift on the slider body 52, so that the head slider 51 is allowed to fly above the surface of the rotating magnetic recording disk in the HDD.

The electrostatic actuator 11 is mounted on the downstream or trailing end surface of the slider body 52. A head base plate 56 is located on the electrostatic actuator 11. The head base plate 56 is coupled to the movable member 13 of the electrostatic actuator 11, for example. A read/write electromagnetic transducer or head 57 is mounted on the head base plate 56. The read/write head 57 may include a read element, such as a giant magnetoresistive (GMR) element and a tunnel-junction magnetoresistive (TMR) element, and a write element such as an inductive write element utilizing a thin film coil pattern. The read and write elements are designed to define so-called gaps at the front ends exposed at the bottom surface 53. The exposed front ends of the read and write elements may be covered with a DLC (diamond-like-carbon) protection layer.

The electrostatic actuator 11 serves to drive or move the movable member 13 along with the head base plate 56 based on a minute electric current or drive signals supplied to the first and second stable electrodes 19a, 19b in the head slider 51, in the same manner as described above. The movement of the head base plate 56 enables a minute displacement of the read/write head 57 in the radial direction of the magnetic recording disk in the HDD. The minute displacement allows the read/write head 57 to reliably keep following a recording track on the magnetic recording disk at a higher accuracy.

Figure 19:
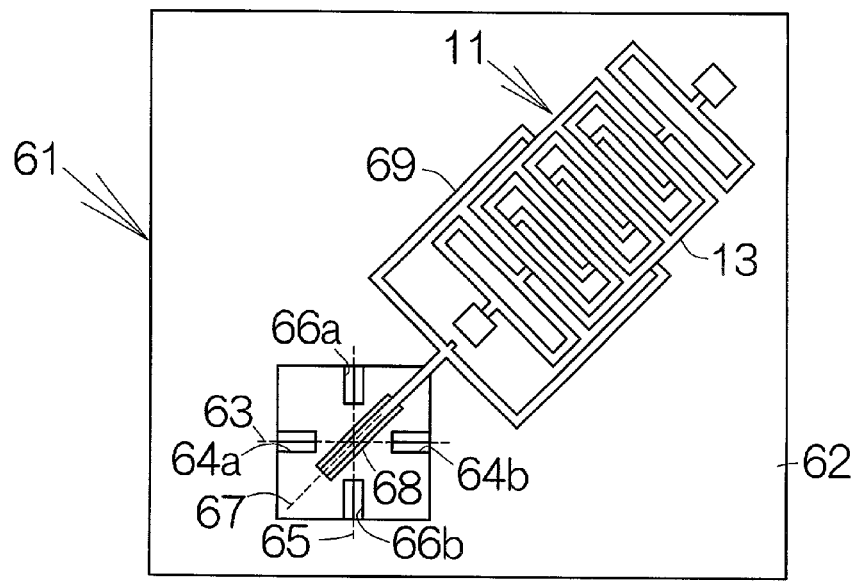
FIG. 19 is a perspective view schematically illustrating an optical switching mechanism incorporating the electrostatic actuator.

Otherwise, the aforementioned electrostatic actuator 11 may be utilized in an optical switching mechanism 61, for example, as shown in FIG. 19. The optical switching mechanism 61 includes a pair of first notches 64a, 64b formed on a basement plane or the surface of a base substrate 62, and a pair of second notches 66a, 66b likewise formed on the surface of the base substrate 62. The first notches 64a, 64b extend on a first datum line 63, while the second notches 66a, 66b extend on a second datum line 65 perpendicular to the first datum line 63. A mirror 68 is disposed between the first notches 64a, 64b as well as between the second notches 66a, 66b. The mirror 68 is allowed to move along a third datum line 67 intersecting the first and second datum lines 63, 65 at an inclined angle of 45 degrees. The third datum line 67 passes through the junction between the first and second datum lines 63, 65, for example. The electrostatic actuator 11 is designed to induce the reciprocation or movement of the mirror 68 along the third datum line 67. The mirror 68 may be attached to an arm member 69 integral to the movable member 13 of the electrostatic actuator 11, for example.

Figure 20:
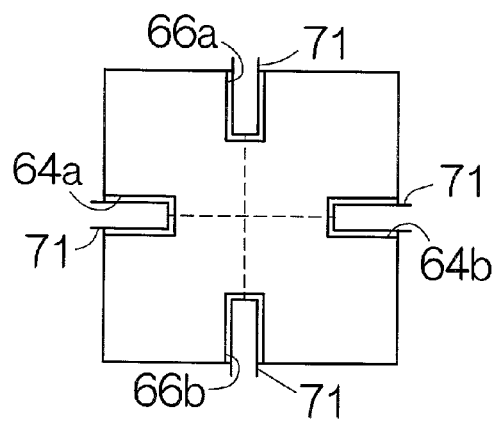
FIG. 20 is an enlarged partial plan view for illustrating a mirror held at a first position in the optical switching mechanism.

As shown in FIG. 20, optical fibers 71 are independently set in the first and second notches 64a, 64b, 66a, 66b in the optical switching mechanism 61. When the movable member 13 is kept at the retreat position so as to position the mirror 68 at a first position, signals can be exchanged between the opposed optical fibers 71, 71 set in the first notches 64a, 64b. Alternatively, signals can be exchanged between the optical fibers 71, 71 set in the second notches 66a, 66b when the mirror 68 is positioned at the first position as described above.

Figure 21:
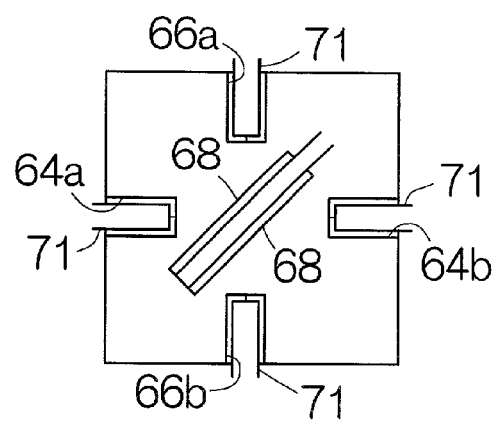
FIG. 21 is an enlarged partial plan view for illustrating the mirror held at a second position in the optical switching mechanism.

As shown in FIG. 21, when the movable member 13 is kept at the advance position so as to position the mirror 68 at a second position, the optical fiber 71 in the first notch 64a can be opposed to the optical fiber 71 in the second notch 66a through the mirror 68. Signals can thus be exchanged between the optical fibers 71, 71 set in the first and second notches 64a, 66a. Likewise, the optical fiber 71 in the first notch 64b be opposed to the optical fiber 71 in the second notch 66b through the mirror 68. Signals can thus be exchanged between the optical fibers 71, 71 set in the first and second notches 64b, 66b. In this manner, the movement of the mirror 68 enables the switching of the paths for optical signals.

What is claimed is:

1. An electrostatic actuator comprising:
    a movable electrode disposed for relative displacement along a basement plane and defining first and second opposed surfaces opposed to each other;
    a first stable electrode column standing on a base substrate;
    a second stable electrode column standing on the base substrate at a location spaced from the first stable electrode column;
    a first stable electrode wall connected to the first stable electrode column and extending between the first and second stable electrode columns, said first stable electrode wall being opposed to the first opposed surface of the movable electrode;
    a second stable electrode wall connected to the second stable electrode column and extending between the first and second stable electrode columns, said second stable electrode wall being opposed to the second opposed surface of the movable electrode; and
    an insulating solid piece connecting at least an end of the first stable electrode wall near the second stable electrode column to the second stable electrode column and an end of the second stable electrode wall near the first stable electrode column to the first stable electrode column,
    wherein the moveable electrode has a thickness W, each of the first and second stable electrode walls has a thickness W, the first and second stable electrode columns are located in a space between the first and second datum planes, the first datum plane is defined to include an outward surface of the first stable electrode wall, the second datum plane is defined to include an outward surface of the second stable electrode wall and a distance between the first and second datum planes is equal to or larger than three times the thickness W of the movable electrode, and
    wherein the insulating solid piece connects the first and second stable electrode walls.

2. The electrostatic actuator according to claim 1, wherein insulating solid piece is made of any of silicon dioxide, silicon nitride, alumina, glass and resin.

3. The electrostatic actuator according to claim 1, wherein said first and second stable electrode walls extend in parallel with each other.

4. The electrostatic actuator according to claim 1, wherein said movable electrode is a frame member surrounding the first and second stable electrode walls.

5. The electrostatic actuator according to claim 1, further comprising insulating layers interposed between the first stable electrode column and the base substrate and between the second stable electrode column and the base substrate, wherein the first and second stable electrode walls are fixed to the base substrate with insulating layers respectively.

6. The electrostatic actuator according to claim 1, wherein the movable electrode has a thickness W, and each of the first and second stable electrode columns includes a bottom surface opposed to the base substrate, each of the bottom surfaces being formed into a quadrate shape, four sides of the quadrate shape having a length equal to or larger than a length 3W.

7. The electrostatic actuator according to claim 1, wherein the movable electrode has a thickness W, each of the first and second stable electrode columns includes a bottom surface opposed to the base substrate, and each of the bottom surfaces of the first and second stable electrode columns has an area that is larger than $9W^2$.

8. The electrostatic actuator according to claim 1, wherein each of the first and second stable electrode columns includes a bottom surface opposed to the base substrate, the electrostatic actuator further comprising:
    insulating layers interposed between the bottom surface of the first stable electrode column and the base substrate and between the bottom surface of the second stable electrode column and the base substrate;
    a conductive wiring pattern extending on the base substrate;
    a first electrically conductive piece interposed between the conductive wiring pattern and the bottom surface of the first stable electrode column, the first electrically conductive piece being surrounded by one of the insulating layers; and
    a second electrically conductive piece interposed between the conductive wiring pattern and the bottom surface of the second stable electrode column, the second electrically conductive piece being surrounded by another one of the insulating layers.

* * * * *